W. RÜHLING.
ARC LAMP.
APPLICATION FILED MAY 11, 1911.
1,050,072.
Patented Jan. 7, 1913.
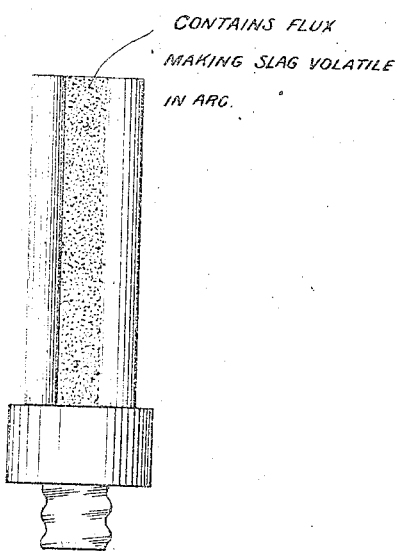
CONTAINS FLUX
MAKING SLAG VOLATILE
IN ARC.
WITNESSES
INVENTOR
Waldemar Rühling
BY
his ATTORNEYS

UNITED STATES PATENT OFFICE.

WALDEMAR RÜHLING, OF BERLIN, GERMANY.

ARC-LAMP.

1,050,072. Specification of Letters Patent. Patented Jan. 7, 1913.

Application filed May 11, 1911. Serial No. 626,412.

*To all whom it may concern:*

Be it known that I, WALDEMAR RÜHLING, a subject of the King of Prussia, and residing at Berlin, Germany, have invented a certain new and Improved Arc-Lamp, of which the following is a specification.

The present invention relates to arc lamps of the candle type, the special object of my invention being to improve the same in the details hereinafter mentioned.

In the accompanying drawings a lamp of this type is shown in side elevation.

As is well understood in lamps of this type there is no mechanical feed or regulating device for starting and maintaining the arc, but the electrodes are arranged in parallel and insulated from each other by an interposed non-conducting barrier. I have previously proposed to provide a barrier of this character containing metal and a carbonaceous material which are fused during the operation of the lamp in proximity to the arc and, upon the extinction of the arc, form a conducting bridge extending between the electrodes which is consumed upon switching in of the current again and thus serves to automatically start the arc. If the barrier comprise for example graphite, gypsum and metal, these are fused by the arc and form, upon the extinction of the lamp, a rigid mass at the top of the unconsumed portion of the barrier. It appears that this mass forms a difficultly fusible slag which works out upon the ends of the electrodes and interferes with the formation of a perfectly normal arc, and furthermore through its obscuring action, lessens the lighting capacity and thus the efficiency of the lamp. To overcome this disadvantage, I now propose to add to the non-conducting barrier, a suitable flux such as cryolite, asbestos powder, or barytes. The addition of this flux prevents the formation of the slag by rendering it volatile in the presence of the arc and thus not only is the burning away of the barrier facilitated, but the electrode ends now project clear of the slag and barrier, the arc is formed without impediment and the full capacity of the lamp secured. Upon extinction of the arc it is found that the conducting bridge which serves to again start the lamp, is formed along the upper edges on each side of the barrier.

Various fluxes may be employed and I do not limit myself to those mentioned.

I claim as my invention:—

In an arc lamp of the character described, an insulating barrier comprising a flux serving to render volatile in the presence of the arc such slag as may tend to form during the operation of the lamp.

In testimony whereof I have signed my name to this specification, in the presence of two subscribing witnesses.

WALDEMAR RÜHLING.

Witnesses:
HENRY HASPER,
RICHARD GOETZ.